(12) United States Patent
Takebe (10) Patent No.: US 7,316,113 B2
(45) Date of Patent: Jan. 8, 2008

(54) CONTROL DEVICE FOR A WORK MACHINE HYDRAULIC PUMP USED IN A WORK VEHICLE

(75) Inventor: Seiichirou Takebe, Mooka (JP)

(73) Assignee: Komatsu Ltd., Tokyo (JP)

( * ) Notice: Subject to any disclaimer, the term of this patent is extended or adjusted under 35 U.S.C. 154(b) by 1 day.

(21) Appl. No.: 10/570,788

(22) PCT Filed: Jul. 12, 2005

(86) PCT No.: PCT/JP2005/012850

§ 371 (c)(1),
(2), (4) Date: Mar. 6, 2006

(87) PCT Pub. No.: WO2006/006600

PCT Pub. Date: Jan. 19, 2006

(65) Prior Publication Data

US 2007/0012039 A1    Jan. 18, 2007

(30) Foreign Application Priority Data

Jul. 14, 2004    (JP) .......................... 2004-207640

(51) Int. Cl.
*F04B 49/00* (2006.01)
*E02F 9/22* (2006.01)

(52) U.S. Cl. .......................... 60/449; 60/431
(58) Field of Classification Search ............ 60/431, 60/449, 452
See application file for complete search history.

(56) References Cited

U.S. PATENT DOCUMENTS

| 5,784,883 | A | * | 7/1998 | Ohkura et al. | 60/449 |
| 5,944,492 | A | * | 8/1999 | Konishi et al. | 60/449 |
| 6,010,309 | A | * | 1/2000 | Takamura et al. | 60/449 |
| 6,073,442 | A |   | 6/2000 | Creger et al. | |
| 6,192,681 | B1 | * | 2/2001 | Tsuruga et al. | 60/452 |
| 6,546,724 | B2 | * | 4/2003 | Nishimura et al. | 60/431 |

FOREIGN PATENT DOCUMENTS

| JP | 1-170730 | | 7/1989 |
| JP | 10-205501 | | 8/1998 |
| JP | 2004-150115 | | 5/2004 |
| JP | 2004150115 A | * | 5/2004 |

* cited by examiner

*Primary Examiner*—Thomas E. Lazo
(74) *Attorney, Agent, or Firm*—Wenderoth, Lind & Ponack, L.L.P.

(57) ABSTRACT

A control device for a work machine hydraulic pump used on a work vehicle according to the present invention has an object to rapidly accelerate the engine to start the vehicle quickly and to rapidly produce a large tractive force when an operator starts depressing the accelerator pedal while operating the work machine operating lever from the neutral position. The control device controls the capacity of the work machine hydraulic pump so as not to exceed the capacity upper limit corresponding to the currently detected engine speed, when the engine speed detected by the engine speed detecting device is equal to or lower than a predetermined speed (maximum torque speed).

4 Claims, 6 Drawing Sheets

CONTROL DEVICE FOR A WORK MACHINE HYDRAULIC PUMP USED IN A WORK VEHICLE

TECHNICAL FIELD

The present invention relates to a device for controlling the capacity of a work machine hydraulic pump of a variable displacement type used in a work vehicle such as a wheel loader.

BACKGROUND ART

In a wheel loader, an engine output (torque) is distributed via a PTO shaft to a traveling load and a work machine load. This means that the engine output (torque) is transferred to drive wheels via a traveling power train (power transmission device) such as a torque converter and a transmission (hydraulic clutch), whereby the vehicle is caused to travel.

The engine output is also transferred to a work machine hydraulic pump to drive the work machine hydraulic pump. Thereby, pressure oil is supplied from the work machine hydraulic pump to a work machine actuator (a hydraulic cylinder, a hydraulic motor) to actuate the work machine (e.g., a loader) to perform work. A part of the horsepower of the engine is consumed as working horsepower (horsepower absorbed by the work machine pump).

Accordingly, a relationship is established which is represented by the equations below:

Engine horsepower=Traveling horsepower+Working horsepower; and

Engine torque=Traveling torque (traveling load)+Work machine torque (work machine load)

The traveling speed of the wheel loader is varied in accordance with a depression amount of the accelerator pedal. Specifically, the engine speed is varied in accordance with the depression amount of the accelerator pedal, and the vehicle speed is varied in accordance with the variation of the engine speed.

In comparison with other work vehicles such as a hydraulic excavator, the wheel loader is used more often in a condition where both the traveling load and the work machine load are applied thereto, for example in a condition where the loader is moved while traveling and producing a tractive force.

The engine mounted on the wheel loader is a diesel engine, and the output of the engine is controlled by adjusting the amount of fuel injected into a cylinder. This adjustment is done by controlling a governor that is attached to a fuel injection pump of the engine. Typically, an all-speed control type governor is used as the governor to adjust the engine speed and the fuel injection amount in accordance with the load so as to achieve a target speed corresponding to an operation amount of the accelerator pedal. This means that the governor controls the fuel injection amount so as to nullify the difference between the target speed and an actual engine speed.

Figure 1:
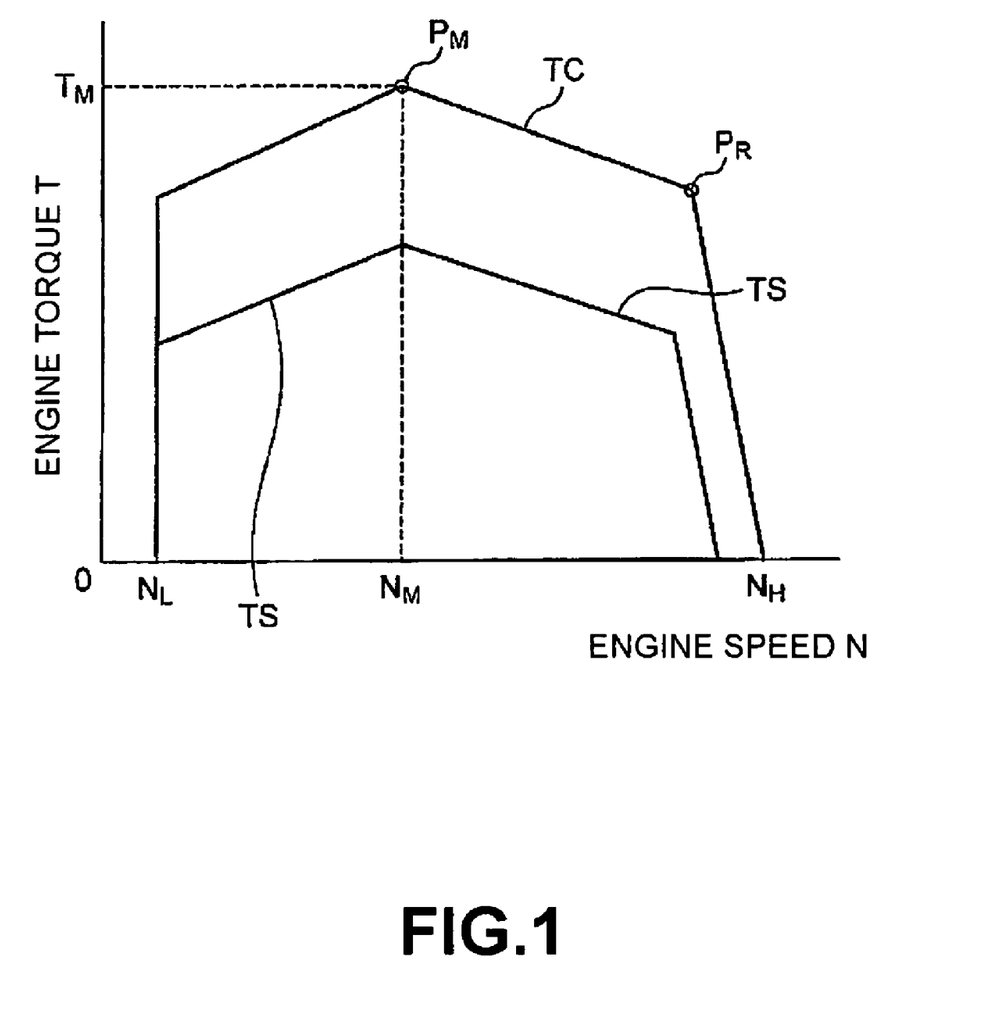
FIG. 1 is a diagram to be referred to for explaining the conventional technique, illustrating a relationship between an engine speed and an engine torque.

FIG. 1 illustrates a relationship between an engine speed N and an engine torque T, or an engine power curve (maximum torque curve) TC. The range defined by the engine power curve TC indicates the performance that the engine can deliver. The governor controls the engine to prevent the torque from surpassing the engine power curve (maximum torque curve) TC and exceeding the engine smoke limit to cause black smoke to be discharged outside, and to prevent the engine speed N from exceeding a high idle speed (no-load maximum speed) NH to cause an overspeed situation. The engine is operated at a low idle speed (no-load minimum speed) NL or above. When the engine speed N has reached the maximum torque speed NM, the maximum torque point PM on the engine power curve TC is attained, and the maximum torque TM can be obtained in the engine. When the engine speed is increased further to reach the rated point PR on the engine power curve TC, a rated output can be obtained.

According to the equations above, the traveling horsepower (traveling torque) is obtained by subtracting the working horsepower (work machine torque) from the engine horsepower (engine torque).

Explaining this with reference to FIG. 1, it is possible to cause the vehicle to travel or to produce a tractive force by transferring the torque corresponding to the torque curve TS obtained by subtracting the work machine load (work machine torque) from the maximum engine torque curve TC to the drive wheels via the traveling power train (power transmission device).

A hydraulic pump of a variable displacement type may be used as the work machine hydraulic pump.

One of the methods for controlling the flow rate discharged from the variable displacement hydraulic pump is a method to control the capacity of the variable displacement hydraulic pump based on a differential pressure across the aperture of an operation valve (flow rate direction control valve) (that is called the closed center system).

A hydraulic circuit employing the closed center system has a load sensing control device incorporated therein.

The "load sensing control" as used here means a control to change the hydraulic pump capacity (cc/rev), specifically the inclination angle of a cam plate such that the differential pressure $\Delta P$ (=Pp–PL) between a discharge pressure Pp of the hydraulic pump and a load pressure PL of the hydraulic actuator such as a hydraulic cylinder is held at a set value $\Delta PLS$.

A load sensing control device includes a variable displacement type hydraulic pump, an operation valve for controlling the flow and the flow rate of pressure oil supplied from the hydraulic pump to a hydraulic cylinder, and hydraulic pump capacity control means. The capacity control means is formed by a hydraulic circuit provided with a cam plate driving unit for driving the cam plate of the hydraulic pump, and a load sensing control valve (LS valve) to control the drive of the cam plate driving unit. The load sensing control valve has a pair of driving units opposing each other, and a discharge pressure Pp of the hydraulic pump and a load pressure PL of the hydraulic cylinder are introduced to these driving units, respectively. The driving unit receiving the load pressure PL is provided with a spring having a spring force corresponding to a fixed differential pressure $\Delta PLS$.

In the hydraulic circuit configured in this manner, when the pressure oil is discharged from the hydraulic pump, the pressure oil is supplied to the hydraulic cylinder via the operation valve to drive the hydraulic cylinder, and to thereby actuate the work machine. Upon the actuation of the work machine, the load sensing control valve operates in response to the differential pressure $\Delta P$ between the hydraulic pump discharge pressure Pp and the hydraulic cylinder load pressure PL (maximum load pressure) to drive the cam plate driving unit. Thereby, the capacity of the hydraulic pump (the cam plate inclination angle) is controlled so that the differential pressure $\Delta P$ is held at the fixed differential pressure $\Delta PLS$ set by the spring.

When an opening area of the operation valve spool is denoted by A, and a coefficient of resistance is denoted by c, the discharge flow rate Q (L/min) of the hydraulic pump can be represented by the equation (1) described below.

$$Q = c \cdot A \cdot \sqrt{(\Delta P)} \quad (1)$$

Since the differential pressure ΔP is held fixed (ΔPLS) by the load sensing control valve, the variation in the discharge flow rate Q of the hydraulic pump only depends on the opening area A of the operation valve spool.

When a work machine operating lever is operated from the neutral position, the opening area A of the operation valve spool is increased in accordance with the operation amount, and the pump flow rate Q is increased in accordance with the increase of the opening area A. Thus, the pump flow rate Q is not affected by the magnitude of the hydraulic cylinder load but only depends on the operation amount of the work machine operating lever. The provision of the load sensing valve thus enables the pump flow rate Q to be varied exactly according to the operator's intension (the operated position of the operating lever) without being increased or decreased by the load. This improves the fine controllability, or the operability in the intermediate operating range.

A description will now be made of variation in the capacity (the cam plate inclination angle) of the work machine hydraulic pump when the work machine operating lever is operated from the neutral position.

The load pressure PL is substantially zero and the hydraulic pump capacity (the cam plate inclination angle) is at a minimum (the minimum inclination angle) when the work machine operating lever is at the neutral position and the operation valve is at its neutral position.

When the work machine operating lever is moved from the neutral position and the operation valve spool is stroked, the pump discharge pressure Pp passes through the aperture of the operation valve to be output as the load pressure PL. The load pressure PLS is thereby increased, and the differential pressure ΔP is decreased in accordance therewith. Therefore, the hydraulic pump capacity (the cam plate inclination angle) becomes a maximum (the maximum inclination angle) to keep the differential pressure at the fixed value. Thus, when the work machine operating lever is operated from the neutral position, the work machine torque (the pump intake torque) assumes a large value.

As seen from FIG. 1, the work machine torque (the pump intake torque) is increased by the load sensing control as described above, but the traveling torque (torque curve TS) used for causing the vehicle to travel or producing the tractive force is decreased by that much.

(Conventional Techniques Disclosed In Patent Publications)

Patent Publication 1 specified below discloses an invention according to which the discharge amount of a work machine hydraulic pump is reduced while a work vehicle is performing excavation in order to reduce the power loss during the excavation work. More specifically, according to the invention of Patent Publication 1, it is checked whether the work machine of the work vehicle is in the excavating position, whether the transmission is in the forward, first-gear position, and whether the vehicle traveling speed is a set speed or lower. If any one of these conditions is detected, it is determined that the work vehicle is performing the excavation, and the capacity of the work machine hydraulic pump is limited to reduce the discharge amount.

Patent Publication 1: U.S. Pat. No. 6,073,442

SUMMARY OF THE INVENTION

Problems to be Solved by the Invention

As shown in FIG. 1, when the engine speed N is in a low speed range, that is, in the range from a low idle speed NL up to a maximum torque speed NM, this means that the operator has started depressing the accelerator pedal.

When the operator starts depressing the accelerator pedal while operating the work machine operating lever from the neutral position, the work vehicle is often in a condition where priority should be given to engine acceleration rather than to rapid actuation of the work machine. For example, when the vehicle is started to the ground while the excavating position of the work machine is corrected, it is desired to rapidly accelerate the engine to rapidly produce a large tractive force as well as to start the vehicle quickly.

When the load sensing control is executed as described above, however, the capacity of the work machine hydraulic pump becomes a maximum at the beginning of moving the work machine operating lever, whereby the work machine torque (the pump intake torque) is increased. Therefore, the traveling torque (torque curve TS) used for causing the vehicle to travel or producing the tractive force becomes small as shown in FIG. 1.

Additionally, the low engine speed range is a low torque range where the engine torque has not attained the maximum torque TM, and the engine horsepower is also in a low horsepower range far from the rated point PM.

For this reason, even if the operator starts depressing the accelerator pedal while operating the work machine operating lever from the neutral position, the engine will not be accelerated rapidly, and it is not possible to start the vehicle quickly or to rapidly produce a large tractive force. Furthermore, the poor engine response gives an unpleasant feeling to the operator and poses a problem of poor operability.

In contrast, when the engine speed N is in a high speed range, this means that the accelerator pedal depression has been completed.

A large force is required for the work machine when the work machine operating lever is operated in the condition where the depression of the accelerator pedal has been completed.

On the other hand, in development of a system for controlling the capacity of the work machine hydraulic pump, there is a demand for cost reduction by simplifying the configuration of a sensor and a control device.

The present invention has been made in view of the above circumstances, and it is an object of the present invention to solve the problems as described below.

a) To rapidly accelerate the engine to cause the vehicle to start quickly and to rapidly produce a large tractive force, when the operator starts depressing the accelerator pedal while operating the work machine operating lever from the neutral position.

b) To enable the work machine to obtain a large force when the work machine operating lever is operated in the condition where the depression of the accelerator pedal has been completed.

c) To enable development of a system for controlling the capacity of a work machine hydraulic pump with a reduced cost by simplifying the configurations of sensors and control devices.

According to the invention disclosed in Patent Publication 1, the capacity of the work machine hydraulic pump is restricted to make the discharge amount small as long as a certain condition is satisfied, and regardless of the magnitude of the engine speed.

Therefore, the capacity of the work machine hydraulic pump is restricted even when the engine is in a high speed range.

This will limit the force of the work machine, and make it impossible to solve the problem b) above, "to enable the work machine to obtain a large force when the work machine operating lever is operated in the condition where the depression of the accelerator pedal has been completed".

Additionally, according to the invention disclosed in Patent Publication 1, it is necessary for controlling the capacity of the work machine hydraulic pump to check whether the work machine of the work vehicle is in the excavating position, whether the transmission is in the forward, first-gear position, and whether the vehicle traveling speed is a set speed or lower. This requires a large number of sensors and complicated control. Therefore, it is impossible to solve the problem c) above, "to enable development of a system for controlling the capacity of a work machine hydraulic pump with a reduced cost by simplifying the configurations of sensors and control devices".

Further, according to the invention disclosed in Patent Publication 1, it is only capable of detecting that the work vehicle is performing excavation. Therefore, it is not possible to solve the problem a) above, "to rapidly accelerate the engine to cause the vehicle to start quickly and to rapidly produce a large tractive force, when the operator starts depressing the accelerator pedal while operating the work machine operating lever from the neutral position".

Means for Solving the Problems

A first aspect of the invention is a control device for a work machine hydraulic pump used in a work vehicle in which an engine torque is transferred to a work machine via the work machine hydraulic pump of a variable displacement type as well as to a traveling body, the control device comprising:

engine speed detecting means for detecting an engine speed;

setting means for presetting an upper limit for a capacity of the work machine hydraulic pump corresponding to an engine speed in a range in which the engine speed is equal to or lower than a predetermined speed; and control means for controlling the capacity of the work machine hydraulic pump not to exceed the capacity upper limit corresponding to a currently detected engine speed, when the engine speed detected by the engine speed detecting means is equal to or lower than the predetermined speed.

A second aspect of the invention is a control device for a work machine hydraulic pump used in a work vehicle in which an engine torque is transferred to a work machine via the work machine hydraulic pump of a variable displacement type as well as to a traveling body, the control device comprising:

engine speed detecting means for detecting an engine speed;

capacity control signal generating means for generating a capacity control signal to make a capacity of the work machine hydraulic pump equal to a desired level;

setting means for presetting an upper limit for the capacity of the work machine hydraulic pump corresponding to an engine speed in a range in which the engine speed is equal to or lower than a predetermined speed; and control means for controlling the capacity of the work machine hydraulic pump such that a desired capacity corresponding to the capacity control signal does not exceed the capacity upper limit corresponding to a currently detected engine speed, when the engine speed detected by the engine speed detecting means is equal to or lower than the predetermined speed.

A third aspect of the invention is the control device for a work machine hydraulic pump used in a work vehicle according to the second aspect of the invention, wherein the work vehicle has a work machine and a work machine hydraulic actuator, the work machine hydraulic actuator being driven according to a pressure oil supplied from the work machine hydraulic pump to the work machine hydraulic actuator to actuate the work machine; and the capacity control signal generating means generates the capacity control signal for making a differential pressure between a discharge pressure of the work machine hydraulic pump and a load pressure of the work machine hydraulic actuator equal to a predetermined pressure.

A fourth aspect of the invention is the control device for a work machine hydraulic pump used in a work vehicle according to the first aspect of the invention, wherein the work vehicle is controlled to vary the engine rotation so as to obtain an engine speed corresponding to an operation amount of traveling operation means; and the capacity of the work machine hydraulic pump is controlled by the control means on a condition that the operation amount of the traveling operation means is equal to or greater than a predetermined operation amount.

A fifth aspect of the invention is the control device for a work machine hydraulic pump used in a work vehicle according to the first aspect of the invention, wherein the work vehicle has a work machine and a work machine hydraulic actuator, the work machine hydraulic actuator being driven by a pressure oil supplied from the work machine hydraulic pump to the work machine hydraulic actuator via a work machine operation valve to actuate the work machine, the work machine operation valve being actuated so as to have an opening area corresponding to an operation amount of work machine operating means; and the capacity of the work machine hydraulic pump is controlled by the control means on a condition that the work machine operating means has been operated.

According to the first aspect of the invention, when an engine speed N detected by the engine speed detecting means $1a$ is a predetermined speed (the maximum torque speed NM) or below, the control means (a controller 18) controls the capacity q of the work machine hydraulic pump 8, for example as shown in FIG. 4($a$), so as not to exceed the capacity upper limit qm corresponding to the currently detected engine speed N.

Figure 4A:
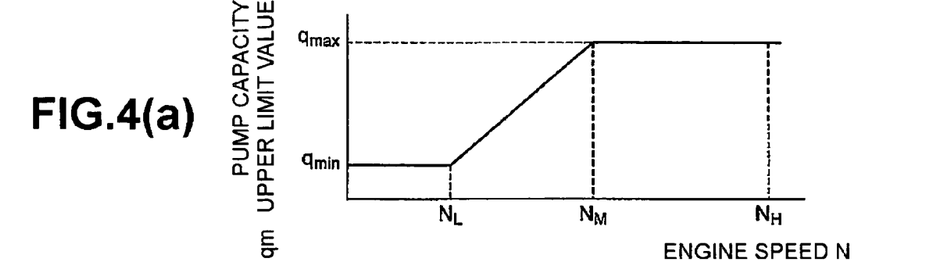

According to the second aspect of the invention, the capacity control signal generating means (an LS valve 22) generates a capacity control signal to make the capacity q of the work machine hydraulic pump 8 equal to a desired level. When an engine speed N detected by the engine speed detecting means $1a$ is a predetermined speed (maximum torque speed NM) or below, the control means (a controller 18) controls the capacity of the work machine hydraulic pump 8, for example as shown in FIG. 4($a$), such that the desired capacity corresponding to the capacity control signal output by the capacity control signal generating means (LS valve 22) will not exceed the capacity upper limit qm corresponding to the currently detected engine speed N.

According to the third aspect of the invention, the capacity control signal generating means (the LS valve 22)

generates a capacity control signal to make a differential pressure ΔP between a discharge pressure Pp of the work machine hydraulic pump 8 and a load pressure PLS of the work machine hydraulic actuator 14 equal to a predetermined pressure PLS.

According to the first, second and third aspects of the invention, when the engine speed N is in a low speed range (speed range of a maximum torque speed NM or below), the capacity q of the hydraulic pump 8 is restricted according to characteristics of a capacity restriction signal as shown in FIG. 4(*a*), for example.

Figure 3:
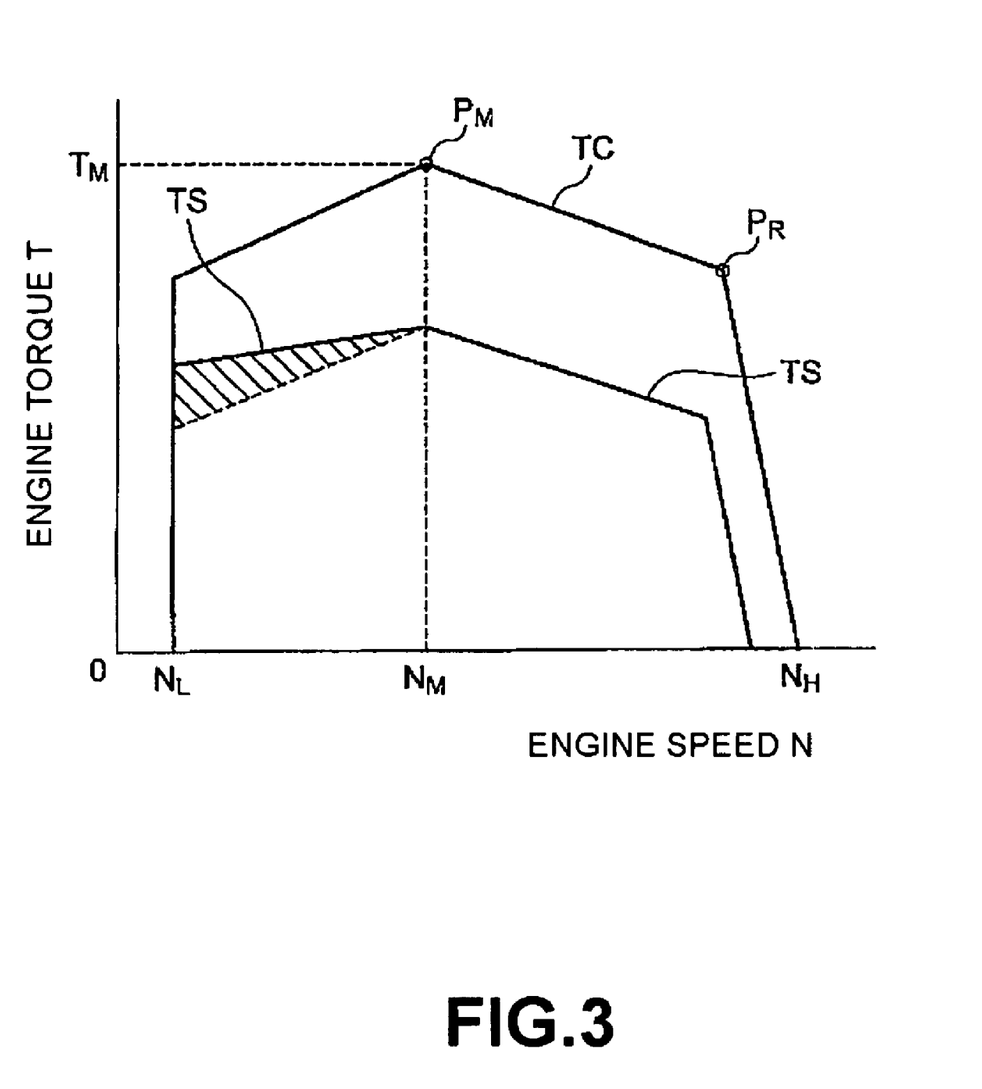
FIG. 3 is a diagram to be referred to for explaining the embodiment, illustrating a relationship between an engine speed and an engine torque.

Therefore, as shown in FIG. 3, the work machine torque becomes smaller than in the conventional technique (FIG. 1) in the range where the engine speed N is equal to or lower than the maximum torque speed NM, by the extent corresponding to the shaded area. The traveling torque (the torque curve TS) used for causing the wheel loader 100 to travel or producing a tractive force is thus increased by the extent to which the work machine torque is decreased (corresponding to the shaded area).

Since the traveling torque (the torque curve TS) is increased in a low speed range of the engine 1, the engine 1 will be rapidly accelerated to quickly start the wheel loader 100 and to rapidly produce a large tractive force, when the operator starts depressing the accelerator pedal 17 while operating the loader operating lever 7 from the neutral position. The response of the engine 1 is improved, whereby the discomfort for the operator is eliminated and the operability is improved.

According to the first, second, and third aspects of the invention, the capacity upper limit qm of the hydraulic pump 8 is the maximum capacity qmax, as shown in FIG. 4(*a*), when engine 1 is in a high speed range (the range in which the engine speed is higher than the maximum torque speed NM). Therefore, the capacity control signal output by the capacity control signal generating means (LS valve 22) is not restricted.

Accordingly, when the engine 1 is in the high speed range, the capacity of the hydraulic pump 8 is controlled according to a normal control (load sensing control) by the capacity control signal generating means. Thus, the force produced by the work machine (loader) will not be restricted and a large force can be obtained.

Figure 5:
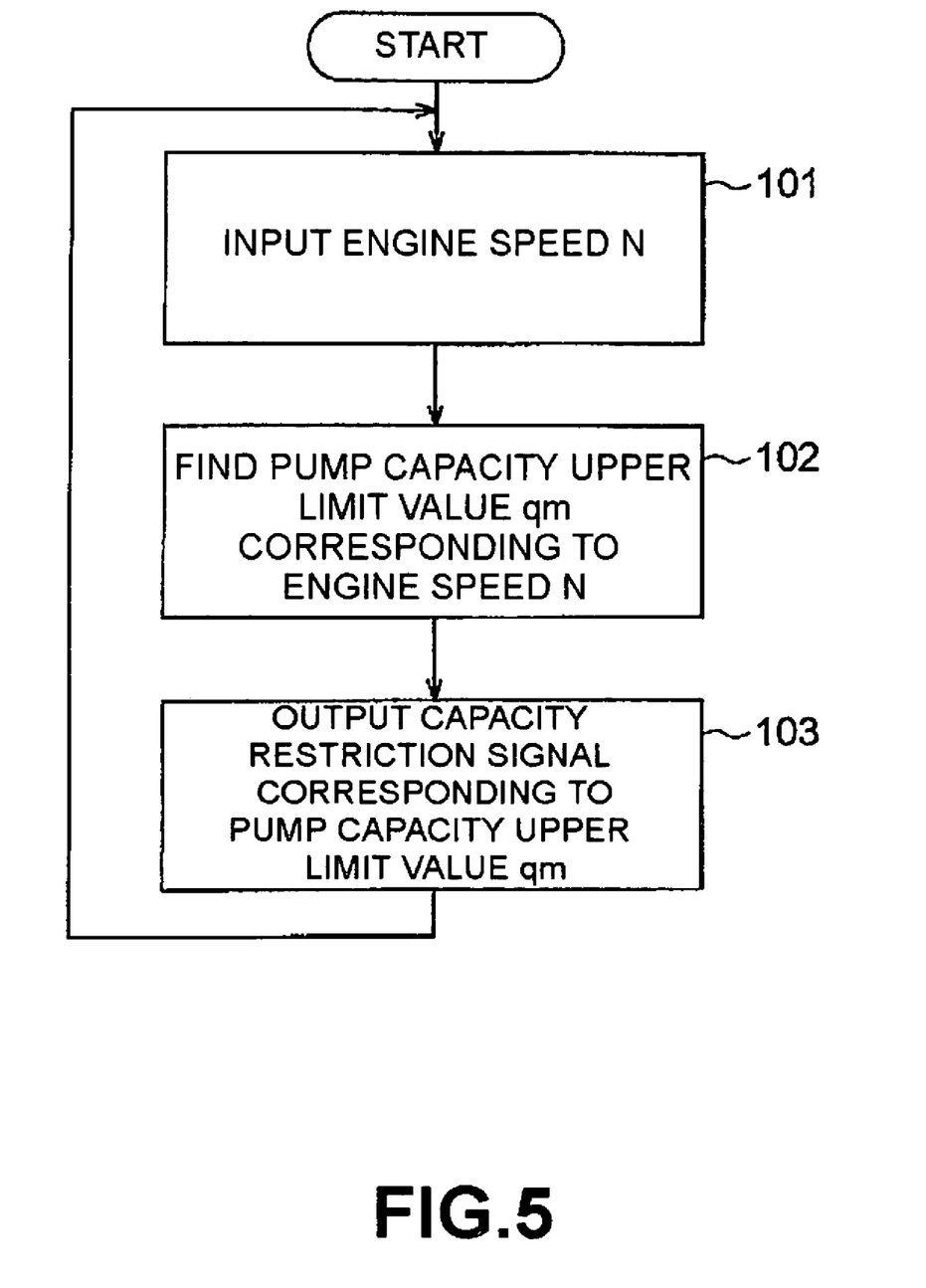
FIG. 5 is a diagram for explaining processing steps performed by the controller.

Only one sensor, namely the engine speed detecting sensor 1*a* is required to execute the control according to the aspects of present invention described above. Moreover, as shown in FIG. 5, the control according to the aspects of the present invention is a simple control whereby a pump capacity upper limit qm corresponding to a detected value N detected by the sensor 1*a* is found based on the characteristics shown in FIG. 4(*a*) and is output as a capacity restriction signal to the servo valve 20 (in the steps 101, 102 and 103). Therefore, the system can be built without making a significant change to the conventional load sensing control system, and hence with a reduced development cost.

According to the fourth aspect of the invention, the control of the capacity of the work machine hydraulic pump 8 is performed by the control means (the controller 18) as described above, on the condition that the operation amount of the traveling operation means (accelerator pedal) 17 is a predetermined operation amount or over. Specifically, it is determined whether or not the operation amount of the traveling operation means (the accelerator pedal 17) is equal to or greater than the predetermined operation amount, and if the operation amount of the traveling operation means (accelerator pedal 17) is equal to or greater than the predetermined operation amount (the accelerator aperture is large), it is determined that the operator has an intention to accelerate the engine 1. Only in this case the control means (controller 18) outputs a capacity restriction signal corresponding to the engine speed N detected by the engine speed detecting sensor 1*a*, as shown in FIG. 4(*a*).

According to the fifth aspect of the invention, the above-mentioned control of the capacity of the work machine hydraulic pump 8 is performed by the control means (the controller 18) on the condition that the machine operating means (the loader operating lever 7) has been operated.

BRIEF DESCRIPTION OF THE DRAWINGS

FIGS. 4(*a*), 4(*b*), 4(*c*), 4(*d*) and 4(*e*) are diagrams illustrating characteristics of respective capacity restriction signals used in the embodiment;

DETAILED DESCRIPTION OF THE INVENTION

A description will now be made on an embodiment of a control device for a hydraulic pump of a work machine used on a work vehicle according to the present invention with reference to the accompanying drawings.

Figure 2:
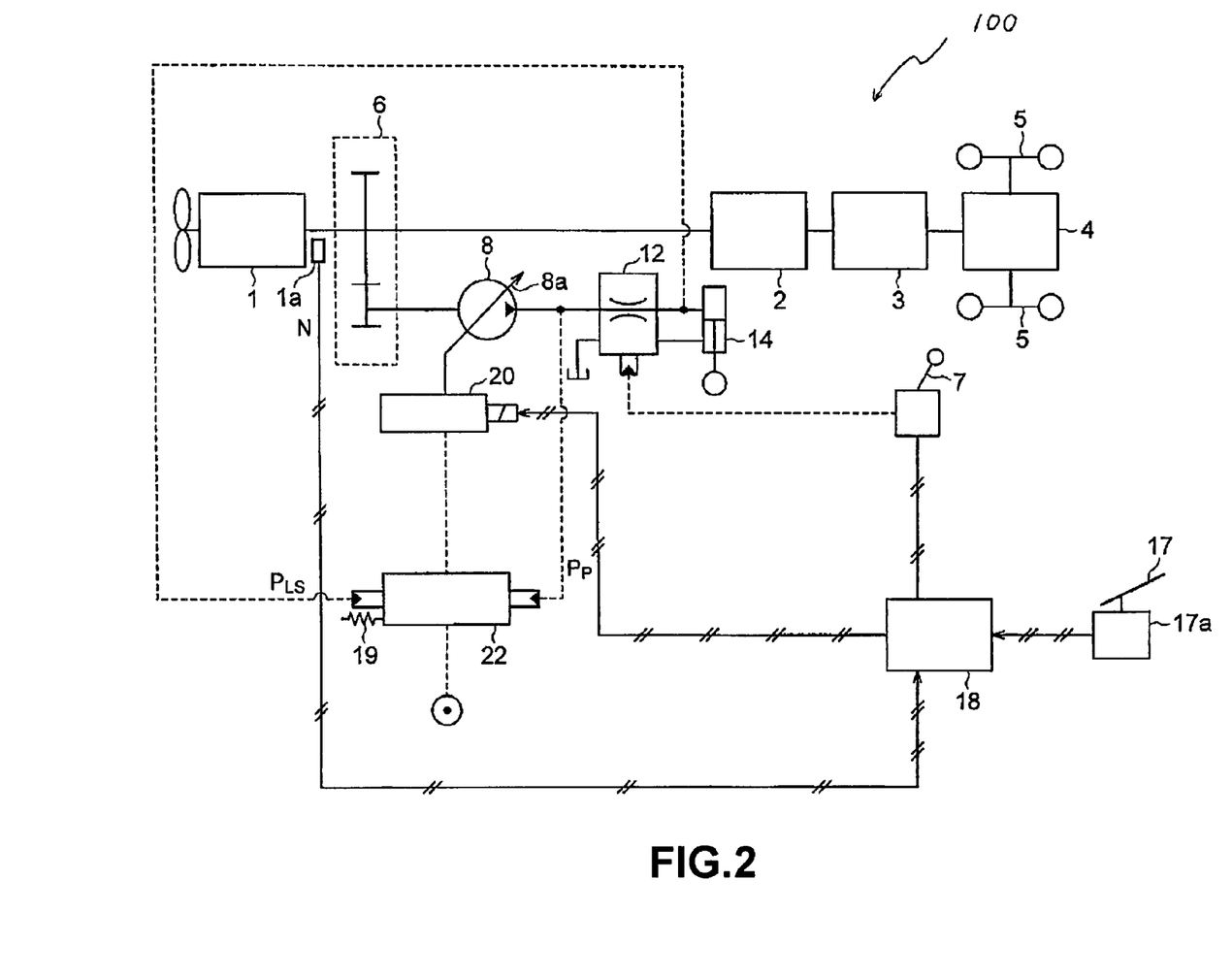
FIG. 2 is a diagram illustrating a configuration of a work vehicle according to an embodiment of the invention.

FIG. 2 illustrates a configuration of a wheel loader 100 according to the embodiment, only for the part relating to the present invention. The following description of the embodiment will be made on the assumption that the work machine is a loader mounted on the front part of the vehicle body.

As shown in FIG. 2, the engine 1 of the wheel loader 100 has an output shaft coupled to a PTO shaft 6. The PTO shaft 6 is coupled to a torque converter 2 and is also coupled to a loader hydraulic pump 8.

The loader hydraulic pump 8 is a hydraulic pump of a variable displacement type, which varies the pump capacity q (cc/rev) in response to a variation in the inclination angle of a cam plate 8*a*.

An output of the engine 1 is transferred to drive wheels 5 via the torque converter 2, a transmission 3, and a differential gear 4. The transmission 3 includes a forward hydraulic clutch, a reverse hydraulic clutch, and gear clutches including a first-gear hydraulic clutch, a second-gear hydraulic clutch, a third-gear hydraulic clutch, and a fourth-gear hydraulic clutch, and is designed such that either the forward hydraulic clutch or the reverse hydraulic clutch is selected according to the vehicle speed or the like and one of the gear clutches is selected to perform gear shifting.

The output of the engine 1 is also transferred to the loader hydraulic pump 8.

Upon the loader hydraulic pump 8 being driven, a discharge pressure oil is supplied to a loader hydraulic cylinder 14 via a loader operation valve 12.

The loader hydraulic cylinder 14 is connected to the loader. The loader is actuated upon the loader hydraulic cylinder 14 being supplied with the pressure oil. Specifically, a boom forming the loader is moved up or down and a bucket is tilted. A spool of the loader operation valve 12 is shifted according to an operation of the loader operating lever 7. The opening area of the operation valve 12 is varied in accordance therewith to change the flow rate of the pressure oil supplied to the loader hydraulic cylinder 14.

The output shaft of the engine 1 is provided with an engine speed detecting sensor 1a for detecting an actual speed N of the engine 1. The engine speed N detected by the engine speed detecting sensor 1a is input to the controller 18.

An accelerator pedal 17 is operated by the operator. The operation amount (depression amount) of the accelerator pedal 17 is detected by a stroke sensor 17a provided in the detect accelerator pedal 17, and a signal indicating the operation amount is input to the controller 18.

The controller 18 controls the engine 1 based on the signal received from the stroke sensor 17a, so that the speed of the engine 1 becomes a target speed according to the operation amount of the accelerator pedal 17.

The engine 1 is a diesel engine, and its output is controlled by adjusting the amount of fuel injected into a cylinder. This adjustment is done by controlling a governor that is attached to the fuel injection pump of the engine 1. An all-speed control type governor is typically used as the governor to adjust the engine speed and the fuel injection amount according to the load so as to obtain a target speed according to the depression amount of the accelerator pedal 17. In other words, the governor increases or decreases the fuel injection amount so as to nullify the difference between the target speed and an actual engine speed. FIG. 3 shows output characteristics of the engine. In FIG. 3, the engine speed N is plotted on the abscissa axis and the engine torque T is plotted on the ordinate axis.

FIG. 3 illustrates a relationship between an engine speed N and an engine torque T, that is, an engine power curve (maximum torque curve) TC. The range defined by the engine power curve TC indicates performance that the engine can deliver. The governor controls the engine 1 so as to prevent the torque from surpassing the engine power curve (the maximum torque curve) TC and exceeding the engine smoke limit to cause black smoke to be discharged outside, and also to prevent the engine speed N from exceeding a high idle speed (no-load maximum speed) NH to cause an overspeed situation. The engine 1 is operated at a low idle speed (no-load minimum speed) NL or higher. When the engine speed N reaches the maximum torque speed NM, the maximum torque point PM is attained on the engine power curve TC, and a maximum torque TM can be obtained in the engine 1. When the engine speed is further increased to attain the rated point PR on the engine power curve TC, a rated output can be obtained.

A description will now be made on the configuration for performing the load sensing control on the loader hydraulic pump 8.

An LS (load sensing) valve 22 generates and outputs a capacity control signal for making the differential pressure ΔP between the discharge pressure Pp of the hydraulic pump 8 and the load pressure PLS of the loader hydraulic cylinder 14 equal to a fixed differential pressure ΔPLS.

The LS valve 22 is provided with a spring 19 for setting the fixed differential pressure ΔPLS. The discharge pressure Pp of the hydraulic pump 8 is applied as a pilot pressure to the pilot port of the LS valve 22 on the opposite side from the spring 19, while the load pressure PLS of the loader hydraulic cylinder 14 is applied as a pilot pressure to the pilot port on the side facing the spring 19.

Accordingly, a capacity control signal (hydraulic signal) for making the differential pressure ΔP equal to the fixed differential pressure ΔPLS is provided from the LS valve 22 to a servo valve 20. The servo valve 20 is actuated in response to the provided capacity control signal to drive the cam plate 8a of the hydraulic pump 8 to control the capacity q of the hydraulic pump 8.

When an opening area of the loader operation valve 12 is denoted by A, and a coefficient of resistance is denoted by c, the discharge flow rate Q of the hydraulic pump 8 can be expressed by the equation:

$$Q = c \cdot A \cdot \sqrt{(\Delta P)} \qquad (1)$$

Since the differential pressure ΔP is fixed by the LS valve 22, the pump flow rate Q varies only depending on an opening area A of the spool of the operation valve 12.

When the loader operating lever 7 is operated, the opening area A of the loader operation valve 12 is increased according to the operation amount, and the pump flow rate Q is increased according to the increase in the opening area A. The pump flow rate Q is not affected by a hydraulic work load but only depends on the operation amount of the loader operating lever 7. The provision of the LS valve 22 enables the pump flow rate Q to vary exactly according to the operator's intension (according to an operated position of the loader operating lever 7) without being increased or decreased by the hydraulic work load. Thus, the fine controllability, or the operability in an intermediate operating range can be improved.

However, by using the load sensing control, the loader hydraulic cylinder 14 always provides a flow rate as requested by the loader hydraulic cylinder 14, regardless of the magnitude of the engine speed N. Therefore, if the loader operating lever 7 is operated from the neutral position, the inclination angle of the cam plate 8a of the hydraulic pump 8 becomes a maximum even when the engine 1 is in the low speed range similarly to when it is in the high speed range. This will increase the discharge pressure and hence the intake torque of the hydraulic pump 8.

Therefore, the controller 18 is designed such that when the speed of the engine 1 is equal to or lower than a predetermined speed, a capacity restriction signal is output to the servo valve 20 to restrict the capacity control signal output by the LS valve 22 to keep the inclination angle of the cam plate 8a of the hydraulic pump 8 at a predetermined level or below.

FIRST EMBODIMENT

FIG. 4(*a*) shows characteristics of the capacity restriction signal output by the controller 18. These characteristics are set in an internal memory of the controller 18 in the form of a function expression or a data table. In FIG. 4(*a*), the abscissa axis indicates an engine speed N and the ordinate axis indicates an upper limit qm of the capacity q (cam plate inclination angle) of the hydraulic pump 8. As shown in FIG. 4(*a*), the capacity restriction signal defines the upper limit qm of the capacity of the work machine hydraulic pump 8 corresponding to the engine speed N, in the range where the engine speed N is equal to or lower than the maximum torque speed NM. The characteristics of the capacity restriction signal are set such that the upper limit qm of the capacity q of the hydraulic pump 8 assumes a minimum value qmin when the engine speed N is at a low idle speed NL, and is then increased in proportion to the increase of the engine speed N to assume a maximum value qmax when the engine speed N is a maximum torque speed NM.

The characteristics of the capacity restriction signal shown in FIG. 4(a) are only an example thereof. The characteristics of the capacity restriction signal may be set as shown in FIG. 4(b) or FIG. 4(c), instead of those shown in FIG. 4(a).

Figure 4B:
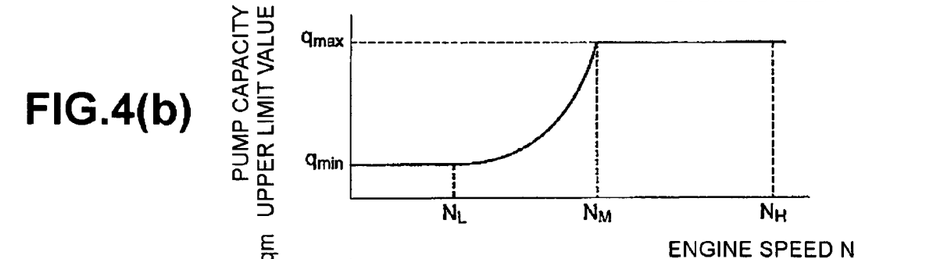

FIG. 4(b) shows an example of characteristics, in which the relation between the engine speed N and the upper limit qm of the capacity of the hydraulic pump 8 is nonlinear.

Figure 4C:
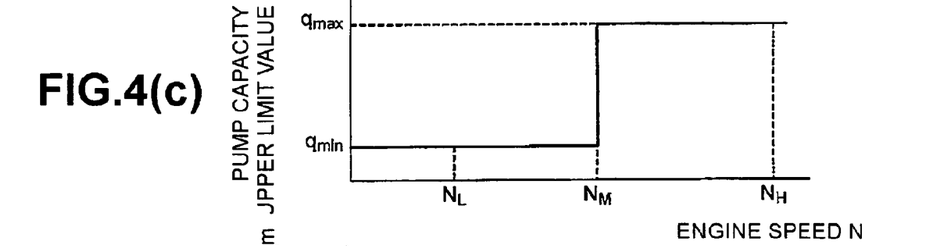

FIG. 4(c) shows characteristics in which the upper limit qm of the capacity of the hydraulic pump 8 is fixed regardless of variation in the engine speed N.

Figure 4D:
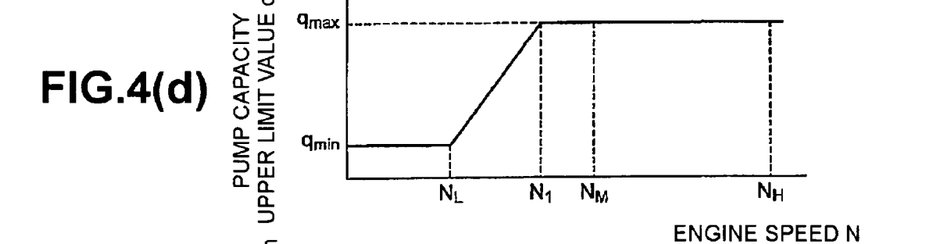
Figure 4E:
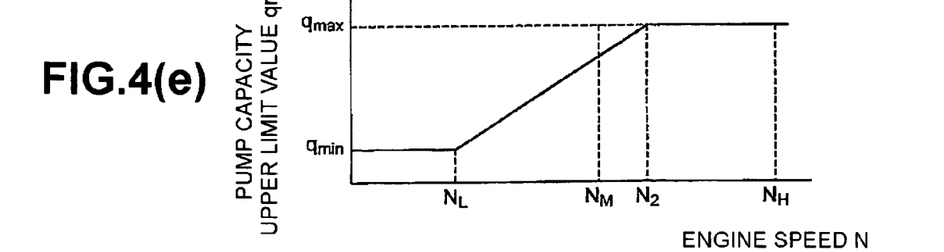

Although the range to restrict the capacity q of the hydraulic pump 8 is defined as the range where the engine speed is equal to or lower than the maximum torque speed NM in FIG. 4(a), the capacity q of the hydraulic pump 8 may be restricted, as shown in FIG. 4(d), in a range where the engine speed is equal to or lower than a predetermined speed N1 that is lower than the maximum torque speed NM. Further, as shown FIG. 4(e), the capacity q of the hydraulic pump 8 may be restricted in a range where the engine speed is equal to or lower than a predetermined speed N2 that is higher than the maximum torque speed NM. The same applies to FIG. 4(b) and FIG. 4(c).

FIG. 5 is a flowchart showing processing steps performed by the controller 18 according to the present embodiment.

An engine speed N detected by the engine speed detecting sensor 1a is input to the controller 18 (step 101).

A capacity upper limit qm corresponding to the input current engine speed N is obtained according to the characteristics shown in FIG. 4(a) (step 102).

A capacity restriction signal indicating the capacity upper limit qm thus obtained is output from the controller 18 and is applied to the servo valve 20 (step 103).

Thereby, the inclination angle of the cam plate 8a of the hydraulic pump 8 is controlled such that a desired capacity corresponding to the capacity control signal output by the LS valve 22 will not exceed the capacity upper limit qm corresponding to the capacity restriction signal output by the controller 18.

When the desired capacity (e.g., the minimum capacity qmin) corresponding to the capacity control signal currently output by the LS valve 22 is equal to or lower than the capacity upper limit qm (e.g., the maximum capacity qmax) corresponding to the capacity restriction signal currently output by the controller 18, the capacity q of the hydraulic pump 8 is adjusted to the desired capacity (the minimum capacity qmin) corresponding to the capacity control signal currently output by the LS valve 22, and the load sensing control is performed.

In contrast, if the desired capacity (e.g., the maximum capacity qmax) corresponding to the capacity control signal currently output by the LS valve 22 is higher than the capacity upper limit qm (e.g., the minimum capacity qmin) corresponding to the capacity restriction signal currently output by the controller 18, the capacity q of the hydraulic pump 8 is adjusted to the capacity upper limit qm (the minimum capacity qmin) corresponding to the capacity restriction signal currently output by the controller 18, whereby the capacity q of the hydraulic pump 8 is restricted.

A description will now be provided regarding the meritorious effects of the present embodiment, with reference to FIG. 3.

When the operator starts depressing the accelerator pedal 17 while operating the loader operating lever 7 from the neutral position, the situation is often such that priority should be given to acceleration of the engine rather than rapid actuation of the loader as the work machine. For example, when the wheel loader 100 is started to the ground while correcting the excavating position of the loader, it is desired to rapidly accelerate the engine 1 to start the wheel loader 100 quickly and at the same time to rapidly produce a large tractive force.

When the load sensing control is performed, a capacity control signal is output, at the beginning of moving the loader operating lever 7, to make the capacity q of the loader hydraulic pump 8 equal to the maximum capacity qmax.

However, according to the present embodiment, the capacity control signal is restricted in a low engine speed range (engine speed range equal to or lower than the maximum torque speed NM) by the capacity restriction signal as described above.

Therefore, according to the present embodiment, as shown in FIG. 3, the work machine torque is made smaller than in the conventional technique (FIG. 1) by the extent corresponding to the shaded area, in the range where the engine speed N is equal to or lower than the maximum torque speed NM. As the result, the traveling torque (the torque curve TS) used for causing the wheel loader 100 to travel or for producing a tractive force is increased by the extent to which the work machine torque is decreased (corresponding to the shaded area).

Since the traveling torque (the torque curve TS) is increased in the low speed range of the engine 1, the engine 1 can be rapidly accelerated to cause the wheel loader 100 to start quickly and to rapidly produce a large tractive force when the depression of the accelerator pedal 17 is started while the loader operating lever 7 is operated from the neutral position. Further, the response of the engine 1 is improved, whereby the discomfort for the operator is eliminated and the operability is improved.

Whereas, according to the present embodiment, the capacity upper limit qm of the hydraulic pump 8 is the maximum capacity qmax when the engine 1 is in the high speed range (the engine speed range higher than the maximum torque speed NM), and the capacity control signal is not restricted.

Therefore, when the engine 1 is in the high speed range, the capacity of the hydraulic pump 8 is controlled by the load sensing control, and the work machine (loader) is allow to generate a large force without restriction.

Furthermore, only one sensor, namely the engine speed detecting sensor 1a is required to carry out the control according to the present embodiment. Moreover, the control according to the present embodiment described above is very simple and easy as shown in FIG. 5, namely a pump capacity upper limit qm corresponding to a detected value N detected by the sensor 1a is found according to the characteristics shown in FIG. 4(a) and is output to the servo valve 20 as a capacity restriction signal. Therefore, the system can be built without making a significant change to the conventional load sensing control system, and hence with a reduced development cost.

SECOND EMBODIMENT

The first embodiment described above may be modified in various ways.

The description on the first embodiment has been made on the assumption of the case in which a capacity control signal is output by the LS valve 22 for performing the load sensing control. However, the system to control the capacity of the hydraulic pump 8 is not limited to the closed center system. The present invention may be applied to the case in which the open center system is employed to control the capacity of the hydraulic pump 8. According to the open center system, a neutral circuit is provided in the loader operation valve 7 to detect the flow rate of pressure oil flowing through the neutral circuit, and the capacity of the hydraulic pump 8 is controlled based on the detected flow rate. In this case, a desired capacity corresponding to a capacity control signal according to the open center system is restricted by a capacity upper limit qm corresponding to a capacity restriction signal output by the controller 18.

THIRD EMBODIMENT

According to the embodiments described above, a capacity restriction signal according to the engine speed N detected by the engine speed detecting sensor 1a is output regardless of the operation amount of the accelerator pedal 17. However, the present invention also may be embodied such that it is determined whether the operation amount of the accelerator pedal 17 is equal to or greater than the predetermined operation amount, and a capacity restriction signal according to the engine speed N detected by the engine speed detecting sensor 1a is output only when it is determined that the operation amount of the accelerator pedal 17 is equal to or greater than a predetermined operation amount (the accelerator aperture is large) and it is determined based on this determination that the operator has an intention to accelerate the engine 1.

In this case, "the processing to input an operation amount detected by the stroke sensor 17a of the accelerator pedal 17 to the controller 18 and to determine whether or not the input operation amount of the accelerator pedal 17 is equal to or greater than a predetermined operation amount" is performed in the step preceding the step 101 in FIG. 5, and the processing proceeds to the step 101 only when the operation amount of the accelerator pedal 17 is equal to or greater than the predetermined operation amount. A pump capacity upper limit qm corresponding to the detected value N detected by the engine speed detecting sensor 1a is obtained based on the characteristics shown in FIG. 4(a) and is output to the servo valve 20 as a capacity restriction signal (in the steps 101, 102 and 103).

FOURTH EMBODIMENT

The description on the embodiments above has been made on the assumption of the case in which a capacity restriction signal is output by the controller 18 regardless of the operated position of the loader operating lever 7.

However, the present invention also may be embodied such that a lever operated position detection sensor is provided to detect the operated position of the loader operating lever 7, and a capacity restriction signal is output by the controller 18 on the condition that the lever operated position detection sensor detects that the loader operating lever 7 has been operated from the neutral position.

In this case, "the processing to input a signal indicating the operated position of the loader operating lever 7 to the controller 18 and to determine whether or not the loader operating lever 7 has been operated from the neutral position" is performed in the step preceding the step 101 in FIG. 5. The processing proceeds to the step 101 only when the loader operating lever 7 has been operated from the neutral position. A pump capacity upper limit qm corresponding to the detected value N detected by the engine speed detecting sensor 1a is then found based on the characteristics shown in FIG. 4(a) and is output to the servo valve 20 as the capacity restriction signal (in the steps 101, 102 and 103).

FIFTH EMBODIMENT

According to the embodiments described above, a capacity restriction signal is output from the controller 18 regardless of the engine speed detected by the engine speed detecting sensor 1a. However, the present invention may also be embodied such that it is determined whether or not the engine speed N detected by the engine speed detecting sensor 1a is equal to or lower than a predetermined speed (maximum torque speed NM), and it is determined that the operator has started depressing the accelerator pedal 17 when the engine speed N is equal to or lower than the predetermined speed (maximum torque speed NM). The capacity restriction signal corresponding to the engine speed N detected by the engine speed detecting sensor 1a is output only when such determination is made.

In this case, "the processing to determine whether or not the engine speed N detected by the engine speed detecting sensor 1a is equal to or lower than the predetermined speed (maximum torque speed NM)" is performed in the step following the step 101 in FIG. 5, and the processing proceeds to the step 102 only when the engine speed N is equal to or lower than the predetermined speed (maximum torque speed NM). A pump capacity upper limit qm corresponding to the detected value N detected by the engine speed detecting sensor 1a is then found based on the characteristics shown in FIG. 4(a) and is output to the servo valve 20 as the capacity restriction signal (in the steps 102 and 103).

SIXTH EMBODIMENT

The description on the embodiments above has been made on the assumption of the case in which a capacity control signal provided from the LS valve 22 to the servo valve 20 is restricted by a capacity restriction signal output from the controller 18 to the servo valve 20.

However, it is also possible to restrict the capacity of the hydraulic pump 8 in the low speed range by alternatively switching the capacity control signal provided to the servo valve 20 between the low speed range and the high speed range of the engine 1.

Figure 6:
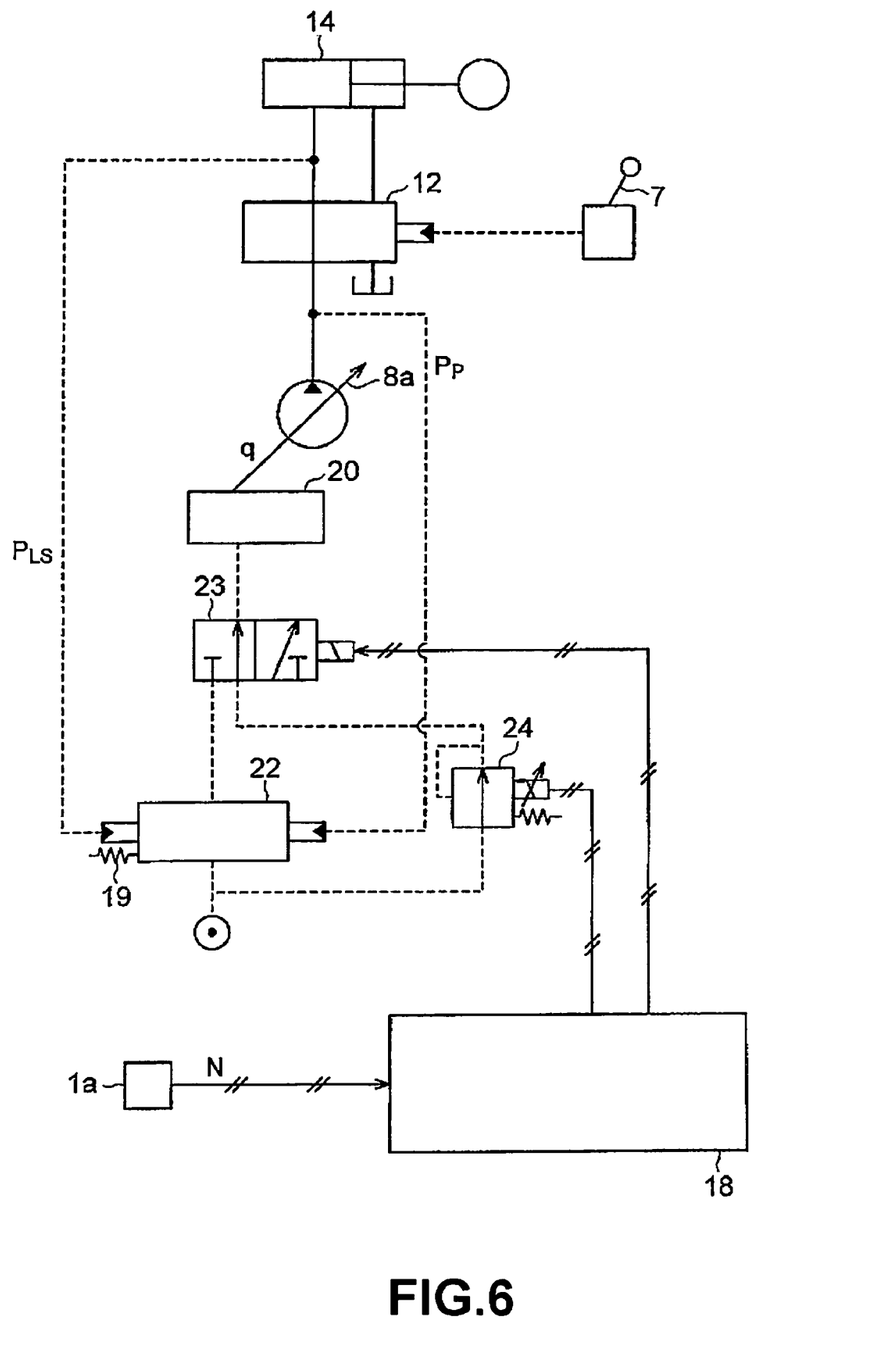
FIG. 6 is a diagram illustrating another example of configuration.

For example, as shown in FIG. 6, a selector valve 23 is provided in the oil passage extending from the LS valve 22 to the servo valve 20. A capacity control signal (electric signal) output from the controller 18 is applied to a proportional pressure reducing valve 24. A capacity control signal (hydraulic signal) that is provided from the proportional pressure reducing valve 24 to the servo valve 20 according to the capacity control signal (electric signal) is defined as a first capacity control signal. On the other hand, the capacity control signal output by the LS valve 22 is defined as a second capacity control signal.

In this case, when the engine speed N detected by the engine speed detecting sensor 1a is equal to or lower than a predetermined speed (the maximum torque speed NM), the selector valve 23 is switched to the position to provide the first capacity control signal to the servo valve 20. Therefore, the controller 18 outputs a capacity control signal according to the characteristics shown in FIG. 4(a), and the first capacity control signal is provided from the proportional pressure reducing valve 24 to the servo valve 20 via the selector valve 23. Accordingly, in the low speed range of the engine 1 (in the engine speed range equal to or lower than the maximum torque speed NM), the capacity q of the hydraulic pump 2 is varied according to the characteristics shown in FIG. 4(a), and the capacity q of the hydraulic pump 8 is restricted. Whereas, when the engine speed N detected by the engine speed detecting sensor 1a is higher than the predetermined speed (the maximum torque speed NM), the selector valve 23 is switched to the position to provide the second capacity control signal to the servo valve 20. Thereby, the second capacity control signal is provided from the LS valve 22 to the servo valve 20 via the selector valve 23. Accordingly, the capacity q of the hydraulic pump 8 is varied according to the load sensing control in the high speed range of the engine 1 (in the engine speed range higher than the maximum torque speed NM).

INDUSTRIAL APPLICABILITY

The present invention is applicable not only to a wheel loader but also to any work vehicle as long as the engine output (engine torque) is distributed to both the traveling load and the work load.

The invention claimed is:

1. A control device for a work machine hydraulic pump used on a work vehicle in which an engine torque is transferred to a work machine via the work machine hydraulic pump of a variable displacement type as well as to a traveling body, the control device comprising:
   engine speed detecting means for detecting an engine speed;
   setting means for presetting an upper limit for a capacity of the work machine hydraulic pump corresponding to an engine speed in a range in which the engine speed is equal to or lower than a predetermined speed; and
   control means for controlling the capacity of the work machine hydraulic pump so as not to exceed the capacity upper limit corresponding to a currently detected engine speed, when the engine speed detected by the engine speed detecting means is equal to or lower than the predetermined speed,
   wherein the work vehicle is controllable to vary engine rotation so as to obtain an engine speed corresponding to an operation amount of a traveling operation means,
   and wherein the capacity of the work machine hydraulic pump is controllable by the control means on a condition that the operation amount of the traveling operation means is equal to or greater than a predetermined operation amount.

2. The control device for a work machine hydraulic pump used on a work vehicle according to claim 1, wherein the work vehicle has a work machine and a work machine hydraulic actuator, the work machine hydraulic actuator being driven by a pressure oil supplied from the work machine hydraulic pump to the work machine hydraulic actuator via a work machine operation valve to actuate the work machine, the work machine operation valve being actuated so as to have an opening area corresponding to an operation amount of work machine operating means; and
   wherein the capacity of the work machine hydraulic pump is controllable by the control means on a condition that the work machine operating means has been operated.

3. A control device for a work machine hydraulic pump used on a work vehicle in which an engine torque is transferred to a work machine via the work machine hydraulic pump of a variable displacement type as well as to a traveling body, the control device comprising:
   engine speed detecting means for detecting an engine speed;
   capacity control signal generating means for generating a capacity control signal to make a capacity of the work machine hydraulic pump equal to a desired level;
   setting means for presetting an upper limit for the capacity of the work machine hydraulic pump corresponding to an engine speed in a range in which the engine speed is equal to or lower than a predetermined speed; and
   control means for controlling the capacity of the work machine hydraulic pump such that a desired capacity corresponding to the capacity control signal does not exceed the capacity upper limit corresponding to a currently detected engine speed, when the engine speed detected by the engine speed detecting means is equal to or lower than the predetermined speed,
   wherein the work vehicle is controllable to vary engine rotation so as to obtain an engine speed corresponding to an operation amount of a traveling operation means,
   and wherein the capacity of the work machine hydraulic pump is controllable by the control means on a condition that the operation amount of the traveling operation means is equal to or greater than a predetermined operation amount.

4. The control device for a work machine hydraulic pump used on a work vehicle according to claim 3, wherein the work vehicle has a work machine and a work machine hydraulic actuator, the work machine hydraulic actuator being driven according to a pressure oil supplied from the work machine hydraulic pump to the work machine hydraulic actuator to actuate the work machine; and
   wherein the capacity control signal generating means is operable to generate the capacity control signal for making a differential pressure between a discharge pressure of the work machine hydraulic pump and a load pressure of the work machine hydraulic actuator equal to a predetermined pressure.

* * * * *